United States Patent [19]
Miyashita et al.

[11] Patent Number: 4,898,911
[45] Date of Patent: Feb. 6, 1990

[54] RESIN COMPOSITION

[75] Inventors: Shunitsu Miyashita; Kenji Mogami, both of Kobe, Japan

[73] Assignee: Kanegafuchi Kagaku Kogyo Kabushiki, Osaka, Japan

[21] Appl. No.: 137,698

[22] Filed: Dec. 24, 1987

Related U.S. Application Data

[63] Continuation-in-part of Ser. No. 122,738, Nov. 19, 1987.

[30] Foreign Application Priority Data

Nov. 20, 1986 [JP] Japan .................................. 61-276927
Dec. 26, 1986 [JP] Japan .................................. 61-314245
May 30, 1987 [JP] Japan .................................. 62-135805

[51] Int. Cl.$^4$ .......................... C08L 37/00; C08L 33/02
[52] U.S. Cl. ........................................ 525/74; 525/72; 525/201; 525/208
[58] Field of Search ................... 525/201, 208, 74, 72

[56] References Cited

U.S. PATENT DOCUMENTS 4,659,757 4/1987 Okamoto ............................ 523/436

FOREIGN PATENT DOCUMENTS 59-115352 7/1984 Japan .
59-184251 10/1984 Japan .................................. 525/166

*Primary Examiner*—Patricia Short
*Attorney, Agent, or Firm*—Armstrong, Nikaido, Marmelstein, Kubovcik & Murray

[57] ABSTRACT

A melt-blended resin composition useful as a modifier for improving the impact resistance of thermoplastic resins which comprises (a) a polymer containing at least one epoxy group per molecule and having a modulus of elasticity in bending of at most $10^4$ kg/cm$^2$, e.g. an $\alpha$-olefin/glycidyl ester or ether copolymer, and (b) a copolymer of an $\alpha$-olefin and an $\alpha,\beta$-unsaturated carboxylic acid wherein at least 5% by mole of the carboxyl groups are neutralized with an alkali metal.

6 Claims, No Drawings

RESIN COMPOSITION

CROSS-REFERENCE TO RELATED APPLICATION

This is a continuation-in-part of application Ser. No. 122,738 filed on Nov. 19, 1987.

BACKGROUND OF THE INVENTION

The present invention relates to a resin composition, and more particularly to a soft resin composition useful for improving the impact resistance of thermoplastic resins, especially thermoplastic resins having ester bonds, carbonate bonds or amido bonds in the molecule.

An improvement in the impact resistance of molded articles of thermoplastic resins has been made generally by blending thermoplastic resins with elastomers. To high performance thermoplastic resins called engineering plastics, this method of blending elastomers has been also applied for the purpose of improving the impact resistance, for instance, as disclosed in Japanese Patent Publication Kokoku No. 58-47419 and No. 59-28223. However, no theory about what elastomers are effective for improving the impact resistance has been established. Also, there are cases where if high performance engineering plastics are blended with elastomers having a relatively low elasticity, the impact resistance is improved, but excellent other properties of engineering plastics such as mechanical strength, heat resistance and chemical properties are impaired. Accordingly, it is the present state that experiments must be repeated by combining the objective engineering plastics with various kinds of elastomeric materials in order to look for the suitable elastomeric materials.

It is an object of the present invention to provide a modifier capable of improving the impact resistance of thermoplastic resins, particularly high performance thermoplastic resins called engineering plastics, without impairing excellent properties that the resins possess such as mechanical strength, heat resistance and chemical properties.

The above and other objects of the present invention will become apparent from the description hereinafter.

SUMMARY OF THE INVENTION

It has now been found that a particular resin composition is useful as the modifier for various thermoplastic resins, and when blended with thermoplastic resins, it improves the impact resistance without substantially impairing the properties of the thermoplastic resins.

In accordance with the present invention, there is provided a melt-blended resin composition comprising (a) 5 to 95% by weight of a resin containing at least one epoxy group per molecule and having a modulus of elasticity in bending of at most $10^4$ kg/cm$^2$ at room temperature, and (b) 95 to 5% by weight of a copolymer of an α-olefin and an α,β-unsaturated carboxylic acid wherein at least 5% by mole of the carboxyl groups are neutralized with an alkali metal and which has a modulus of elasticity in bending of at most $10^4$ kg/cm$^2$ at room temperature.

DETAILED DESCRIPTION

The term "modulus of elasticity in bending" as used herein means the value obtained by dividing the bending stress that a material suffers within the elastic limit by the strain which generates in the material, and it is represented by the unit kg/cm$^2$. The larger the value, the smaller the deformation of material against a constant load.

Polymers containing at least one epoxy group per molecule and having a modulus of elasticity in bending of at most $10^4$ kg/cm$^2$ at room temperature (about 23° C.) are used in the present invention as the component (a). The epoxy group can attach to the polymers in the form of glycidyl ether group, glycidyl ester group, glycidylamino group, or a group derived from a reaction of an N-heterocycle-containing compound and epichlorohydrin as well as epoxy group.

Examples of the epoxy-containing polymer (a) are, for instance, a copolymer of an α-olefin having 2 to 20 carbon atoms and a polymerizable glycidyl compound having 5 to 40 carbon atoms; a copolymer of an alkyl acrylate or methacrylate having a $C_1$ to $C_{36}$ alkyl group and a polymerizable glycidyl compound having 5 to 40 carbon atoms; a polyolefin to which a glycidyl ether group is introduced such as polyolefins having glycidyl ether group at one or both ends; a graft copolymer of 1 to 90% by weight of methyl acrylate or methacrylate with 99 to 10% by weight of ethylene/glycidyl acrylate or methacrylate; both end epoxidated polybutadiene; epoxidated 1,2-polybutadiene; and the like. All of compounds having α-olefinic group and glycidyl group can be used as the glycidyl compound to be copolymerized with α-olefin or alkyl (meth)acrylate, but usually there are used glycidyl compounds having 6 to 40 carbon atoms, e.g. an α,β-unsaturated carboxylic acid glycidyl ester such as glycidyl acrylate or methacrylate, a glycidyl ether such as allyl glycidyl ether, and a glycidyl group-containing (meth)acrylate oligomer.

Preferable epoxy-containing polymers (a) are copolymers of one or more of α-olefins such as ethylene, propylene, 1-butene, 1-hexene and 1-octene and one or more of α,β-unsaturated caboxylic acid glycidyl esters or polymerizable double bond-containing glycidyl ethers such as glycidyl acrylate, glycidyl methacrylate, cyclohexene-4-carboxylic acid glycidyl ester and allyl glycidyl ether. The copolymers may contain a minor amount of other copolymers may contain a minor amount of other copolymerizable monomers, e.g. at most 10% by weight of other monomers such as vinyl acetate, methyl acrylate or methyl methacrylate. Representative examples of the α-olefin/glycidyl ester or ether copolymers are, for instance, ethylene/glycidyl (meth)acrylate copolymer (e.g. random copolymer of ethylene and glycidyl methacrylate in a ratio of 9:1 by weight having a flow rate of 3.0 g/10 min., or ethylene/glycidyl methacrylate copolymer commercially available under the trade mark "Bondfast" 2C made by Sumitomo Chemical Co., Ltd.), a ternary copolymer of ethylene, glycidyl (meth)acrylate and vinyl acetate (e.g. ethylene/glycidyl methacrylate/vinyl acetate copolymer commercially available under the trade mark "Bondfast" 7B made by Sumitomo Chemical Co., Ltd.), ethylene/propylene/glycidyl methacrylate/vinyl acetate copolymer, and ethylene/allyl glycidyl ether copolymer. The content of the glycidyl ester or ether in the copolymer is preferably from 1 to 30% by weight, especially 5 to 20% by weight. The content of not less than 1% by weight is desirable from the viewpoints of the improvement in impact resistance and the compatibility with thermoplastic resins.

Representative examples of the alkyl (meth)acrylate/glycidyl ester or ether copolymer are, for instance, ethyl acrylate/glycidyl acrylate or methacrylate copolymer and butyl acrylate/allyl glycidyl ether copolymer.

The epoxy-containing polymer is effective for improving the impact resistance of thermoplastic resin molded articles so long as at least one epoxy group is present in the molecule. Preferably, the content of units having epoxy group in the polymer is at least 1% by mole from the viewpoint of the improvement in impact resistance. When the content of the units having epoxy group is more than 10% by mole, the composition of the invention becomes hard and, therefore, the improvement in the impact resistance of molded articles tends to decrease.

Also, the epoxy-containing polymers used in the present invention are those having a modulus of elasticity in bending of at most 10,000 kg/cm$^2$ at room temperature (23° C.). Preferably, the modulus of elasticity in bending is from 100 to 4,000 kg/cm$^2$. The epoxy-containing polymer having a modulus of elasticity in bending of more than 10$^4$ kg/cm$^2$ at room temperature should be avoided, since the effect of improving the impact resistance is decreased.

The component (b) used in the present invention is copolymers of $\alpha$-olefins and $\alpha,\beta$-unsaturated carboxylic acids wherein at least 5% by mole of the carboxyl groups are neutralized with an alkali metal. They are known as ionomers. Examples of the $\alpha$-olefin are, for instance, ethylene, propylene, 1-butene, 1-octene, 1-hexene, and the like. The $\alpha$-olefin may be used alone or in admixture thereof. Examples of the $\alpha,\beta$-unsaturated carboxylic acid are for instance, a monocarboxylic acid such as acrylic acid, methacrylic acid or crotonic acid, and a dicarboxylic acid such as maleic acid or fumaric acid. The carboxylic acids may be used alone or in admixture thereof. Preferably, the content of the $\alpha$-olefin in the ionic copolymer (b) is at least 50% by weight, especially from 50 to 95% by weight.

The copolymer (b) may contain at most 25% by weight, preferably at most 10% by weight, of other copolymerizable monomers, e.g. alkyl (meth)acrylates having a $C_1$ to $C_{10}$ alkyl group such as methyl acrylate, methyl methacrylate or butyl acrylate.

At least 5% by mole, preferably at least 30% by mole, more preferably at least 50% by mole, of the acid groups are neutralized with an alkali methal such as sodium or potassium. When the degree of neutralization is at least 5% by mole, the impact resistance of thermoplastic resins is greatly improved. This improvement is marked particularly when at least 30% by mole of carboxyl groups are neutralized with sodium ion.

The copolymers (b) used in the present invention are those having a modulus of elasticity in bending of not more than 10$^4$ kg/cm$^2$ at room temperature (about 23° C.), preferably 100 to 4,000 kg/cm$^2$. When the modudus of elasticity in bending is more than 10,000 kg/cm$^2$, the impact resistance is not sufficiently improved.

The epoxy-containing polymer (a) and the copolymer (b) are melt-blended in a ratio of 5:95 to 95:5 by weight, preferably 40:60 to 90:10 by weight, more preferably 50:50 to 80:20 by weight, at a temperature of 150° to 280° C., preferably 170° to 200° C., to react them. When the (a)/(b) ratio is outside the above range, the effect of improving the impact resistance of thermoplastic resins is insufficient. When the melt-blending temperature is lower than 150° C., the reaction between the components (a) and (b) does not promptly proceed. Also, if the temperature for blending the components (a) and (b) is higher than 280° C., gellation occurs and the effect of improving the impact resistance is decreased.

When blended with thermoplastic resins, particularly with engineering plastics, the composition of the present invention exerts an excellent effect of improving the impact resistance of the thermoplastic resins. The resin composition (modifier) of the invention is particularly useful for thermoplastic resins containing ester bonds, carbonate bonds or amido bonds in the molecule. Representative examples of the thermoplastic resins to which the modifier of the invention is applicable are, for instance, polyester such as polyethylene terephthalate (PET) or polybutylene terephthalate, polyamide, polycarbonate, polyarylate, (meth)acrylic acid ester polymers, polystyrene, polyvinyl chloride (PVC), acrylonitrile-butadiene-styrene copolymer (ABS), and the like. The modifier of the present invention may be used in combination with other known reinforcing agents or modifiers such as methyl methacrylate-butadiene-styrene copolymer (MBS) and methyl methacrylate-acrylonitrile-butadiene-styrene copolymer (MABS). The modifier of the invention is also applicable to fiber glass reinforced thermoplastics and shows a large effect on improvement of impact resistance.

The modifier of the invention is incorporated in thermoplastic resins in an amount such that the ratio of the modifier to the thermoplastic resins is from 5:95 to 50:50 by weight. When the amount of the modifier is less than the above range, the improvement in the impact resistance is insufficient, and even if the modifier is used in an amount larger than the above range, the impact resistance does not raise according to the additional amount of the modifier.

The composition of the present invention may contain usual additives which have been generally used for resin composition, for example, stabilizer, coloring agent, antistatic agent, flame retarder, processing improver, and the like. Further, the composition of the invention may contain a reinforcing material such as glass fiber or carbon fiber, or a filler such as talc, mica, glass beads or calcium carbonate, in an amount of at most 60% by weight.

The composition of the present invention can be incorporated into thermoplastic resins by various known methods, for example, by a method using an extruder.

Molded articles propared from thermoplastic resins incorporated with the resin composition of the invention has an excellent impact resistance and, therefore, can be used suitably as housing for light electrical appliances, automoblie parts, body for power tools, and the like.

The present invention is more specifically described and explained by means of the following Examples in which all parts and % are by weight unless otherwise noted. It is to be understood that the present invention is not limited to the Examples.

EXAMPLES 1 to 3

There were mixed 75 parts of a copolymer of ethylene and glycidyl methacrylate in a weight ratio of 9:1 having a flow rate of 3.0 g/10 minutes measured according to ASTM D 1238 E (hereinafter referred to as "EGMA") and 25 parts of a random copolymer of 87% of ethylene, 6.5% of methacrylic acid and 6.5% of sodium methacrylate having a melt index of 1.0 g/10 minutes measured according to ASTM D 1238 (hereinafter referred to as "EMANa-1"). The mixture was melt-blended at 205° C. by a biaxial extruder (model PCM-45 made by Ikegai Tekko Kabushiki Kaisha), and extruded.

The extruded composition (modifier) was incorporated in the thermoplastic resin shown in Table 1 by blending using the biaxial exturder at the temperature shown in Table 1. The obtained extrudate was injection-molded to give test specimens, and the impact resistance was evaluated according to the following methods.

The results are shown in Table 1.

Also, the modifiers obtained in Examples 1 to 3 were extracted with xylene for 10 hours under reflux. In each case, the amount of eluted matter from the modifier was less than 5%.

Modulus of elasticity in bending

The modulus of elasticity in bending of the components (a) and (b) was measured according to ASTM D 790.

Izod impact strength (notched)

Measurement was made according to ASTM D 256.

Impact strength by falling weight method

The test was made with respect to specimens having a thickness of 3 mm using an egg apple type weigth of 500 g in weight and ⅜ inch in top portion radius R. The 50% failure height (the height which causes the failure of 50% of the number of test pieces tested) is shown in the table.

EXAMPLES 4 and 5

To 100 parts of the composition (modifier) shown in Table 1 were added 0.2 part of a stabilizer (commercially available under the trade mark "Irganox" 1010 made by Ciba-Geigy AG.) and 0.2 part of a stabilizer (commercially available under the trade mark "Seanox" 412S made by Shipro Kasei Kaisha Co.). The mixture was melt-blended and extruded, and then was incorporated in polyethylene terephthalate by using an extruder. The resulting blend was dried at 80° C. for 24 hours under vacuum, and was injection-molded to give test specimens.

The results are shown in Table 1.

COMPARATIVE EXAMPLES 1 to 3

The procedure of each of Examples 2, 4 and 5 was repeated except that the component (a), the component (b) and the thermoplastic resin were simultaneously blended instead of blending the thermoplastic resin with the modifier consisting of the components (a) and (b).

The results are shown in Table 1.

TABLE 1

| | Modifier (weight ratio) | | | | Modulus of elasticity in bending (kg/cm$^2$) | | Degree of neutralization of carboxyl groups by Na in component (b) | Temperature of melt-blending |
|---|---|---|---|---|---|---|---|---|
| | Component (a) | | Component (b) | | Component (a) | Component (b) | (% by mole) | (a) and (b) |
| Ex. 1 | EGMA*$^1$ | 75 | EMANa-1*$^4$ | 25 | 900 | 3900 | 50.0 | 205° C. |
| Ex. 2 | EGMA | 75 | EMANa-1 | 25 | 900 | 3900 | 50.0 | 205° C. |
| Ex. 3 | EGMA | 75 | EMANa-1 | 25 | 900 | 3900 | 50.0 | 205° C. |
| Ex. 4 | BA-AGE*$^2$ | 50 | EMANa-2*$^5$ | 50 | 1000 | 3800 | 28.6 | 180° C. |
| Ex. 5 | E-GMA-VA*$^3$ | 67 | EMANa-2 | 33 | 300 | 3800 | 28.6 | 197° C. |
| Com. Ex. 1 | EGMA | 75 | EMANa-1 | 25 | 900 | 3900 | 50.0 | — |
| Com. Ex. 2 | BA-AGE | 50 | EMANa-2 | 50 | 1000 | 3800 | 28.6 | — |
| Com. Ex. 3 | E-GMA-VA | 67 | EMANa-2 | 33 | 300 | 3800 | 28.6 | — |

| | Composition of test specimen (%) | | | | Temperature of blending (a), (b) and thermoplastic resin | Izod impact strength (notched) (kg · cm/cm) | Falling weight impact strength (cm) |
|---|---|---|---|---|---|---|---|
| | Modifier | Thermoplastic resin Kind | Amount | Glass fiber*$^{10}$ | | | |
| Ex. 1 | 15 | PC*$^6$ | 70 | 15 | 270° C. | 16.0 | 20 |
| Ex. 2 | 30 | PET-1*$^7$ | 40 | 30 | 280° C. | 21.0 | 42 |
| Ex. 3 | 20 | PA*$^8$ | 40 | 40 | 270° C. | 17.8 | 44 |
| Ex. 4 | 40 | PET-2*$^9$ | 60 | — | 280° C. | 31.1 | >75 |
| Ex. 5 | 30 | PET-2 | 35 | 35 | 280° C. | 28.4 | 55 |
| Com. Ex. 1 | 30 | PET-1 | 40 | 30 | 280° C. | 16.5 | 31 |
| Com. Ex. 2 | 40 | PET-2 | 60 | — | 280° C. | 25.8 | >75 |
| Com. Ex. 3 | 30 | PET-2 | 35 | 35 | 280° C. | 21.0 | 42 |

(Notes)
*$^1$EGMA: Ethylene/glycidyl methacrylate copolymer (9/1 by weight, flow rate 3.0 g/10 min.)
*$^2$BA-AGE: Butyl acrylate/allyl glycidyl ether copolymer having a Mooney viscosity of 30 (allyl glycidyl ether content: 4.5%)
*$^3$E-GMA-VA: Ethylene/glycidyl methacrylate/vinyl acetate copolymer (85/10/5 by weight) having a melt index of 7 g/10 min. (ASTM D-1238)
*$^4$EMANa-1: Random copolymer of 87% of ethylene, 6.5% of methacrylic acid and 6.5% of methacrylic acid sodium salt having an MI of 1.0 g/10 min. (ASTM D-1238)
*$^5$EMANa-2: Random copolymer of about 86% of ethylene, about 10% of methacrylic acid and about 4% of methacrylic acid sodium salt having an MI of 2.8 g/10 min. (ASTM D-1238)
*$^6$PC: Polycarbonate (trade mark "Panlite", product of Teijin Limited)
*$^7$PET-1: Modified polyethylene terephthalate having an intrinsic viscosity of 0.60 (in phenol/1,1,2,2-tetrachloroethane = 1/1 by weight at 25° C.) wherein 65% of a polyethylene terephthalat oligomer is copolymerized with 35% of an addition polymerization product of ethylene oxide with polypropylene glycol (trade mark "Nissan Unilub" 20DP/15B made by Nippon Oil and Fats Co., Ltd., ethylene oxide/propylene oxide = 20/80 by weight, average molecular weight 1,300)
*$^8$PA: Polyamide (trade mark "Alamin" CM 1017 made by Toray Industries, Inc.)

TABLE 1-continued

*[9] PET-2: Modified polyethylene terephthalate having intrinsic viscosity of 0.60 (in phenol/1,1,2,2-tetrachloroethane = 1/1 by weight at 25° C.) wherein 90% of a polyethylene terephthalate oligomer (pentamer) was copolymerized with 10% of a bisphenol A-ethylene oxide addition polymerization product having an average molecular weight of 1,000 by melt-blending them under reduced pressure

*[10] Glass fiber: commercially available under the trade mark "Glasslon" 03JA-429 made by Asahi Fiber Glass Kabushiki Kaisha From the results shown in Table 1, it would be apparent that the resin composition of the present invention prepared by melt-blending the epoxy-containing polymer (a) and the ionomer (b) imparts an excellent impact resistance to thermoplastic resins.

In addition to the ingredients used in the Examples, other ingredients can be used in the Examples as set forth in the specification to obtain substantially the same results.

What we claim is:

1. A melt-blended resin composition consisting essentially of:
   (a) 5 to 95% by weight of a resin containing at least one epoxy group per molecule and having a modulus of elasticity in bending measured according to ASTM D790 of at most $10^4$ kg/cm$^2$ at room temperature, and
   (b) 95 to 5% by weight of a copolymer of an α-olefin and an α,β-unsaturated carboxylic acid wherein at least 5% by mole of the carboxyl groups are neutralized with an alkali metal and which has a modulus of elasticity in bending measured according to ASTM D790 of at most $10^4$ kg/cm$^2$ at room temperature.

2. The composition of claim 1, wherein said epoxy-containing resin (a) is a resin having a group selected from the group consisting of glycidyl ether group, glycidyl ester group, glycidyl amino group and a group derived from a reaction of an N-heterocycle-containing compound and epichlorohydrin.

3. The composition of claim 1, wherein said epoxy-containing resin (a) is a copolymer of an α-olefin and 1 to 30% by weight of an α,β-unsaturated carboxylic acid glycidyl ester or a polymerizable double bond-containing glycidyl ether.

4. The composition of claim 1, wherein said epoxy-containing resin (a) is a member selected from the group consisting of an ethylene/glycidyl (meth)acrylate copolymer, an alkyl acrylate/glycidyl (meth)acrylate copolymer, an alkyl acrylate/allyl glycidyl ether copolymer, an ethylene/glycidyl (meth)acrylate/vinyl acetate copolymer, and a graft copolymer of 1 to 90% by weight of methyl (meth)acrylate with 99 to 10% by weight of an ethylene/glycidyl (meth)acrylate copolymer.

5. The composition of claim 1, wherein said copolymer (b) is a copolymer of an α-olefin, an α,β-unsaturated carboxylic acid and an alkyl acrylate or methacrylate having a $C_1$ to $C_{10}$ alkyl group.

6. The composition of claim 1, wherein said alkali metal is sodium or potassium.

* * * * *

UNITED STATES PATENT AND TRADEMARK OFFICE
CERTIFICATE OF CORRECTION

PATENT NO.  : 4,898,911

DATED       : February 6, 1990

INVENTOR(S) : MIYASHITA et al

It is certified that error appears in the above-identified patent and that said Letters Patent is hereby corrected as shown below:

On the cover page, Item [73], "Kanegafuchi Kagaku Kogyo Kabushiki" should read --Kanegafuchi Kagaku Kogyo Kabushiki Kaisha--.

Signed and Sealed this

Eighteenth Day of June, 1991

Attest:

HARRY F. MANBECK, JR.

Attesting Officer

Commissioner of Patents and Trademarks